United States Patent
Kalliokulju et al.

(10) Patent No.: US 6,553,006 B1
(45) Date of Patent: Apr. 22, 2003

(54) RESOURCE ALLOCATION IN PACKET-FORMAT DATA TRANSMISSION

(75) Inventors: Juha Kalliokulju, Vesilahti (FI); Matti Turunen, Tampere (FI)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 09/370,737

(22) Filed: Aug. 9, 1999

(30) Foreign Application Priority Data

Aug. 10, 1998  (FI) ................................................ 981728

(51) Int. Cl.$^7$ .............................................. H04B 7/00
(52) U.S. Cl. ....................................... 370/310; 370/337
(58) Field of Search ................................ 370/310, 314, 370/321, 329, 337, 341, 347, 437, 442, 465, 468; 455/450, 451, 452

(56) References Cited

U.S. PATENT DOCUMENTS

| | | | |
|---|---|---|---|
| 5,640,485 A | 6/1997 | Ranta | 395/2.6 |
| 5,787,080 A | 7/1998 | Hulyalkar et al. | 370/348 |
| 5,864,603 A | 1/1999 | Haavisto et al. | 379/88 |
| 5,915,239 A | 6/1999 | Haavisto et al. | 704/275 |
| 6,363,058 B1 * | 3/2002 | Roobol et al. | 370/314 |

FOREIGN PATENT DOCUMENTS

| | | |
|---|---|---|
| EP | 632672 A3 | 1/1995 |
| EP | 0755164 A2 | 1/1997 |
| GB | 2 220 117 A | 12/1999 |

OTHER PUBLICATIONS

Ludwig et al, Link Layer Analysis of the General Packet Radio Service in GSM, IEEE, pp. 520–530, 1997.*
Cai et al, General Packet Radio Service in GSM, IEEE, pp. 122–131, 1997.*
Brasche et al, Concepts, Services, and Protocol of the New GSM Phase 2+ General Packet Radio Service, IEEE, pp. 94–104, 1997.*
Qureshi et al, Dynamic Resource Allocation for GSM–GPRS Services over a LEO Satellite System, IEEE, pp. 20–24, 1997*
ETSI, GSM 04.65, SNDCP, TS 101 297, pp. 1–35, 1998.*
ETSI, GSM 04.64, LLC, TS 101 351, pp. 1–57, 1998.*
De Mare, Link Adaptation in GPRS, Master Thesis Report, pp. 1–43, Mar. 1998.*
Finnish Office Action.

* cited by examiner

*Primary Examiner*—Dang Ton
*Assistant Examiner*—Frank Duong
(74) *Attorney, Agent, or Firm*—Perman & Green, LLP

(57) ABSTRACT

The invention relates to a method for allocating resources for a data transmission connection between a wireless communication device and a mobile communication network. In the method, the information to be transmitted is divided into at least a first and a second quality of service class. For the data transmission connection, either a fixed resource or a dynamic resource is allocated on the basis of the quality of service class in which the information to be transmitted in the data transmission connection is classified.

14 Claims, 3 Drawing Sheets

RESOURCE ALLOCATION IN PACKET-FORMAT DATA TRANSMISSION

Figure 1:
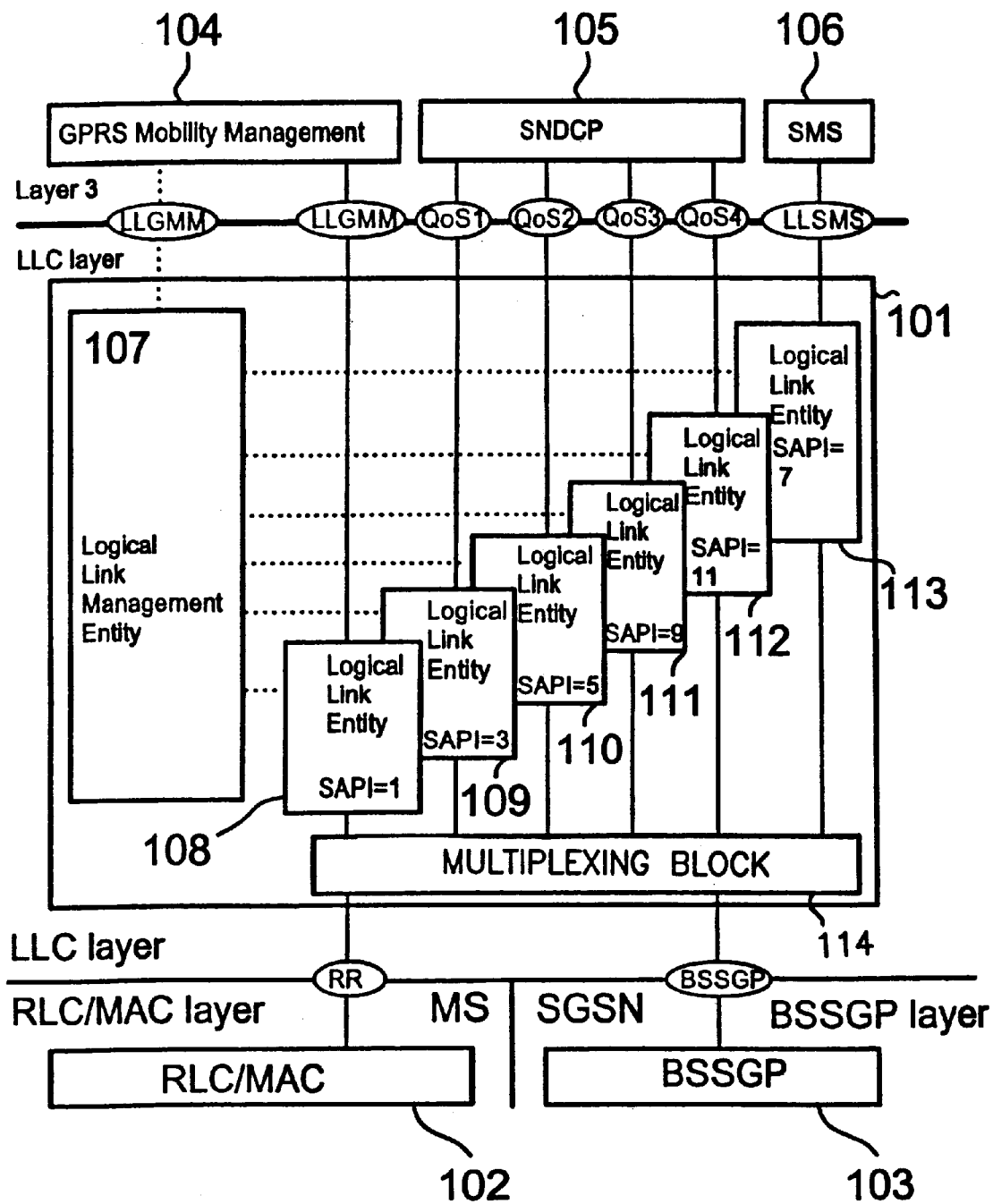

The present invention relates to a method according to the preamble of the appended claim 1, a communication device according to the preamble of the appended claim 7, and a communication system according to the preamble of the appended claim 10.

The term "wireless communication system" refers generally to any communication system which enables wireless communication between a wireless communication device (MS) and the fixed parts of the system, when the user of the wireless communication device is moving within the service area of the system. A typical wireless communication system is a public land mobile network PLMN. The majority of wireless communication systems in use at the time of filing this application belong to so-called second generation mobile communication systems, of which the widely known GSM mobile communication system (Global System for Mobile telecommunications) can be mentioned as an example. The present invention is especially well applicable to third generation mobile communication systems currently under development. In this specification, a GPRS system (General Packet Radio Service) which is being standardized at present, will be used as an example of such a mobile communication system. It is obvious that the invention is also applicable in other mobile communication systems, in which it is possible to define different quality of service levels, or the like, for a data transmission connection.

The GPRS system defines the concept of bearer services. Generally it corresponds to the communication channel of prior systems, which is used to define e.g. a user data rate and quality of service (QoS), both provided by the system in the data transmission between a wireless communication device and some other part of the mobile communication network.

One of the most difficult functions of the bearer services is to provide a sufficient quality of service level reliably for each user. The general packet radio service GPRS is a new service under development for the GSM mobile communication system. The functional environment of the GPRS system comprises one or more subnetwork service areas, which are connected to form a GPRS backbone network. The subnetwork comprises numerous support nodes (SN), of which serving GPRS support nodes (SGSN) will be used as an example in this specification. The serving GPRS support nodes are connected to the mobile communication network (typically to a base station via an interface unit) in such a way that they can provide packet switching services for wireless communication devices via base stations (cells). The mobile communication network provides packet-switched data transmission between the support node and the wireless communication device. Different subnetworks are, in turn, connected to an external data network, for example to a public switched data network (PSDN), via GPRS gateway support nodes (GGSN). Thus, the GPRS service enables packet-format data transmission between a wireless communication device and an external data network, wherein certain parts of the mobile communication network form an access network.

In order to use the GPRS services, the wireless communication device first performs a GPRS attach, with which the wireless communication device indicates to the network that it is ready for packet data transmission. The GPRS attach establishes a logical link between the wireless communication device and the support node SGSN, and thereby allows short message services (SMS) via the GPRS network, paging services via the support node, and notifying the wireless communication device of incoming packet data. Furthermore, in connection with the GPRS attach of the wireless communication device, the support node provides a mobility management function (MM) and performs user authentication. To transmit and receive information, a packet data protocol (PDP) is activated, with which a packet data address to be used in packet data connection is defined for the wireless communication device, wherein the address of the wireless communication device is known in the gateway support node. Thus, in the GPRS attach, a data transmission connection is established to the wireless communication device, to the support node and to the gateway support node, and a protocol (e.g. X.25 or IP), a connection address (e.g. X.121 address), a quality of service level, and a network service access point identifier (NSAPI) are defined for this connection. The wireless communication device activates the packet data connection with an activate PDP context request, in which the wireless communication device reports the temporary logical link identity (TLLI), the packet data connection type, the address, the required quality of service level, the network service access point identifier, and possibly also the access point name (APN).

The quality of service level defines, for instance, how packet data units (PDU) are processed in the GPRS network during transmission. For example the quality of service levels defined for the connection addresses are used to control the transmission order, buffering (packet queues) and discarding packets in the support node and in the gateway support node, especially when there are simultaneously two or more connections which have packets to be transmitted. Different quality of service levels define different delays for packet transmissions between different ends of the connection, different bit rates and the number of discarded packet data units can vary in connections of different quality of service level.

For each connection (connection address), it is possible to request a different quality of service level. For example in e-mail connections, a relatively long delay can be allowed in the message transmission. However, interactive applications, for example, require high-speed packet transmission. In some applications, as in file transfer, it is important that the packet transmission is virtually flawless, wherein packet data units are re-transmitted in error situations, if necessary.

In the current GPRS system, the quality of service level profile contains five different parameters: service precedence, delay class, reliability, mean bit rate and maximum bit rate. Service precedence defines a kind of priority for the packets belonging to a certain connection. Delay class defines average and maximum delays for all the packets belonging to the same connection. Reliability defines whether in the data transmission an acknowledgement (ARQ) is used or not (no ARQ) in the logical link control layer LLC and in the radio link control layer RLC. Furthermore, reliability is used to define whether a protected mode is used in unacknowledged data transmission, and whether the GPRS backbone network uses the TCP or the UDP protocol when transmitting packets belonging to the connection. On the basis of these said parameters, four quality of service classes are established in the GPRS system, which define the quality of service provided by the LLC layer to the connection. These quality classes are distinguished by a special service access point identifier (SAPI).

The appended FIG. 1 presents the function of a known LLC protocol layer 101 in a wireless communication device and in a GPRS support node. Block 102 illustrates the functions of a known RLC/MAC (Radio Link Control/Media Access Control) layer, which are necessary between the LLC layer 101 and the wireless communication device (not shown). Correspondingly, block 103 illustrates the functions of a known BSSGP (Base Station Subsystem GPRS Part) layer, which are necessary between the LLC layer 101 and the nearest serving GPRS support node (not shown). The interface between the LLC layer 101 and the RLC/MAC layers is called the RR interface, and the interface between the LLC layer 101 and the BSSGP layers is called the BSSGP interface.

Above the LLC layer 101, there are known GPRS mobility management functions 104, SNDCP functions 105, and short message service functions 106, which all belong to a layer 3 in the presented layer structure. Each one of these blocks has one or more interfaces to the LLC layer 101, for coupling to the different parts of the same. Logical link management block 107 has an LLGMM control interface (Logical Link—GPRS Mobility Management) to the block 104. The mobility management data is routed via the LLGMM interface between the block 104 and the first LLE block (Logical Link Entity) of the LLC layer. The second 109, third 110, fourth 111, and fifth 112 LLE block connect to block 105 via corresponding couplings. Terms QoS 1, QoS 2, QoS 3, and QoS 4 are also used for these blocks according to the quality of service level of the packets processed by these blocks. The sixth LLE block 113 of the LLC layer is connected to block 106 via an LLSMS interface (Logical Link—Short Message Service). The service access point identifiers of the first 108, second 109, third 110, fourth 111, fifth 112, and sixth LLE block are 1, 3, 5, 9, 11, and 7, respectively. In the LLC layer, each one of these LLE blocks is connected to a multiplexing block 114 which processes connections via the RR interface to block 102, and further to the wireless communication device, as well as connections via the BSSGP interface to block 103 and further towards the support node SGSN.

The connection between the multiplexing block 114 and the lower layer block 102 in the direction of the wireless communication device is called a "transmission pipe". Because all the packet flows between the upper parts of the LLC layer and lower layers 102 travel via the same multiplexing block 114 and transmission pipe, the quality of service level refers to this transmission pipe. When setting up a connection, resources are allocated for it in the mobile communication network in such a way that the quality of service level of the connection would be as close as possible to that requested. In the wireless communication device it is, however, possible to have several applications requiring packet data service running simultaneously. Consequently, certain resources are allocated for these applications, which resources, if divided among different applications, may cause problems in maintaining the quality of service level. For example, in case there are both real time applications and non-real time applications running simultaneously, for which the resources are allocated dynamically, the transmission of packets of a non-real time application also takes up resources from real time applications, whose quality of service level can thus be impaired, for instance due to transmission delays. This could be taken into account by allocating a fixed resource for the applications, but that, however, results in an unnecessary consumption of the resources of the mobile communication network.

The purpose of the present invention is to reduce the aforementioned drawbacks and to provide a more efficient method and system for allocating resources in packet-format data transmission. The invention is based on the idea that resources are allocated for an application either fixedly or dynamically, depending on the quality of service level required by the application. The method according to the invention is characterized in what will be presented in the characterizing part of the appended claim 1. The communication device according to the invention is characterized in what will be presented in the characterizing part of the appended claim 7. The communication system according to the invention is characterized in what will be presented in the characterizing part of the appended claim 10.

Considerable advantages are achieved with the present invention when compared with methods and systems of prior art. With the method according to the invention, it is possible to reliably ensure a certain quality of service level for each packet data application connection running in a wireless communication device, irrespective of the other connections active in the wireless communication device. Furthermore, the capacity of a mobile communication network provided with a packet data service can be used more effectively because there are no resources unnecessarily allocated.

Figure 2:
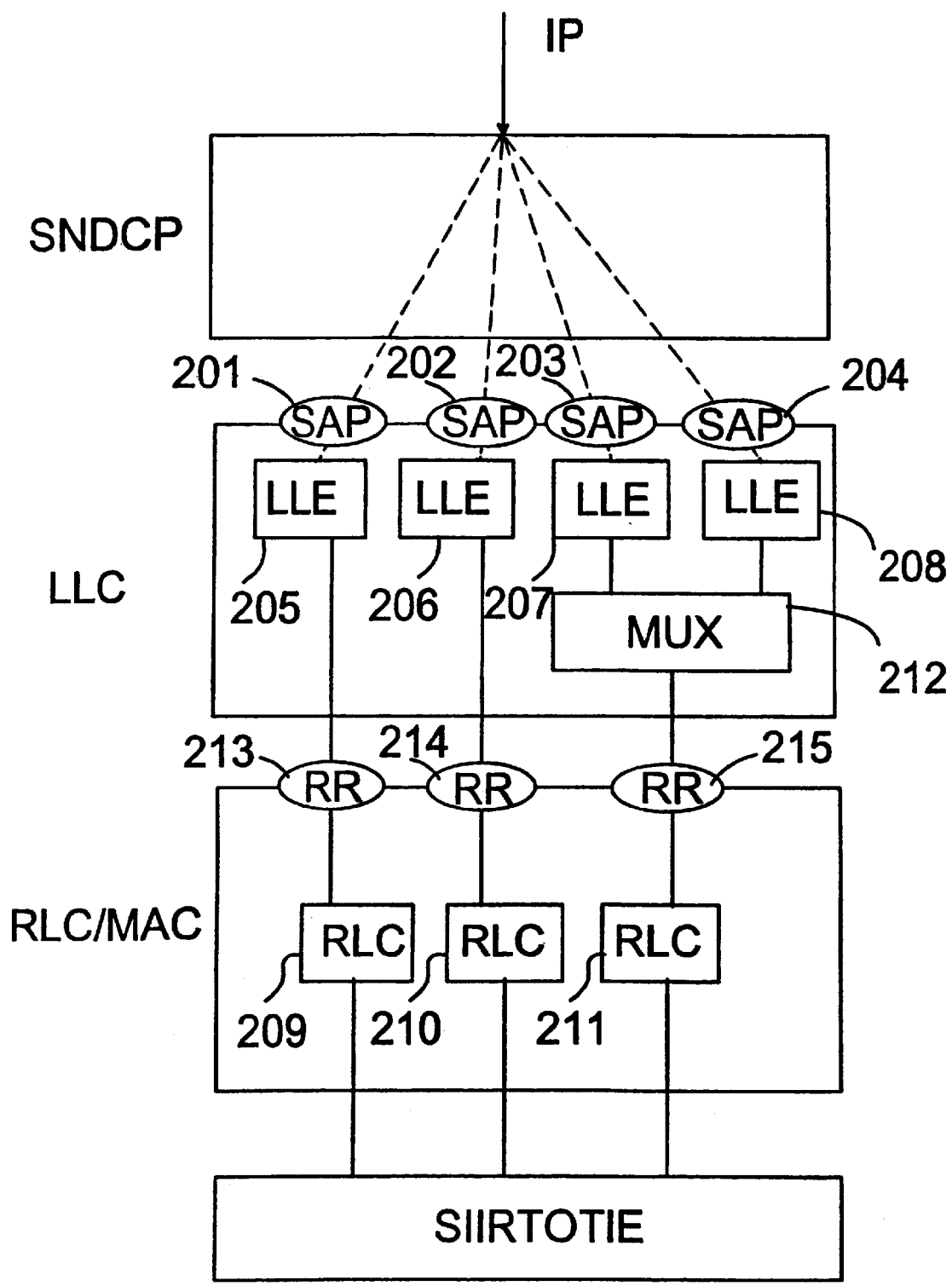
Figure 3:
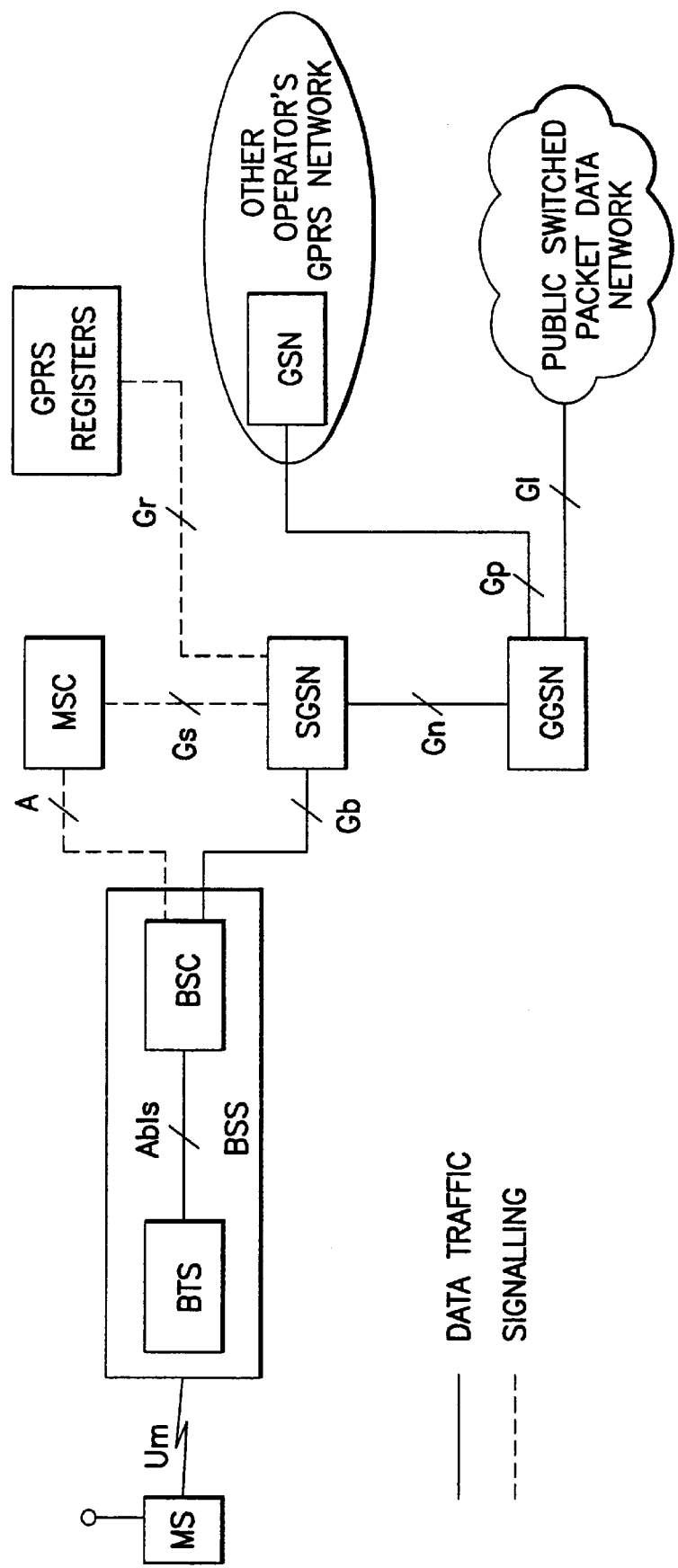

In the following, the invention will be described in more detail with reference to the appended figures, in which FIG. 1 shows a protocol stack according to prior art, FIG. 2 shows a protocol stack according to a preferred embodiment of the invention, and FIG. 3 shows a preferred system in which it is possible to apply the invention.

In the following description of a preferred embodiment of the invention, a GPRS type wireless communication system is used as an example, but it is obvious that the invention is not restricted solely to this system but it can also be applied to other message transmission systems which may have different quality requirements for message transmission.

The protocol stack in FIG. 2 shows only the layers essential for understanding the invention. The messages transmitted between a wireless communication device and a mobile communication network enter a link layer LLC for example from an application layer, and they are e.g. packets IP according to the Internet protocol. In an SNDCP block (Subnetwork Dependent Convergence Protocol) the packets are divided into different queues according to the quality of service requirements defined for each packet. In this specification, four quality of service levels QoS are used as an example: a first class, a second class, a third class and a fourth class. One criterion defined for the first and the second class is the real time quality of the data transmission, wherein significant delays must not occur in the packet transmission. The accuracy of the data transmission is not, however, such a significant criterion. Correspondingly, for the third and fourth class packets, non-real time data transmission is sufficient, but relatively accurate packet transmission is required. An example of real time first class data transmission that can be mentioned in this context, is the transmission of speech signals in a situation where two or more people discuss with each other via wireless communication devices. An example of a situation where real time second class data transmission could be possible is the transmission of a video signal for immediate viewing. Third class, non-real time packet communication can be utilized e.g. for using database services, such as browsing Internet home pages, in which data transmission with moderate speed and accuracy is a more important factor than real time data transmission. In the fourth class in this example system it is possible to categorize for instance the transfer of e-mail messages and files.

Communication divided in four different quality of service levels is suggested to be implemented, for instance, in the second phase of the GPRS system. Definitions of these classes are presented in Table 1.

the LLE blocks are transferred via one RR interface to the RLC layer. Correspondingly, a demultiplexing block has to be implemented in the RLC layer, from which block these packet flows are directed to correct RLC blocks. Thus the

TABLE 1

| Class | First class: real time, e.g. telephone conversation - guaranteed capacity - no acknowledgement | Second class: real time, e.g. video information - guaranteed capacity - acknowledgement possible - buffering on application level | Third class: interactive best effort method - acknowledgement - Internet browser, Telnet - real time control channel | Fourth class: background transmission with best effort method - acknowledgement - background download of e-mail messages, calendar events, etc |
|---|---|---|---|---|
| Delay | 100 ms, 200 ms, 300 ms | <1 s | 2 s | not defined |
| Bit error rate | $10^{-3}, 10^{-4}, 10^{-5}, 10^{-6}$ | $10^{-5}, 10^{-6}, 10^{-7}, 10^{-9}$ | $<10^{-9}$ | $<10^{-9}$ |
| Max bit rate | $MB_{max}$ & $MB_{min}$, network returns MB': $MB_{min} < MB' < MB_{max}$ | $MB_{max}$ & $MB_{min}$, network returns MB': $MB_{min} < MB' < MB_{max}$ | not defined | not defined |
| User priority | High, medium, low | High, medium, low | High, medium, low | High, medium, low |

The SNDCP block transmits the packets via a service access point 201, 202, 203, 204 (SAP) to the LLC layer. For the service access points 201, 202, 203, 204, service access point identifiers SAPI are defined, on the basis of which it is determined in the SNDCP block to which service access point the packets of each queue are transferred. The LLC layer contains an LLE block 205, 206, 207, 208 (Logical Link Entity) for each packet queue corresponding to the quality of service level. In this example, first class packets are transmitted to the first LLE block 205, second class packets to the second LLE block 206, third class packets to the third LLE block 207, and fourth class packets to the fourth LLE block 208.

The LLE block implements the functions of the LLC protocol layer, such as possible re-transmissions of packets. In the protocol stack of FIG. 2, below the LLC layer, there is a radio link control layer RLC/MAC (Radio Link Control/Media Access Control) in the connection between a wireless communication device and mobile communication network. In a protocol stack of prior art, this is implemented with one RLC block which is responsible e.g. for requesting resource allocation in the mobile communication network for all packets to be transmitted to the radio channel. In this preferred embodiment of the invention, one RLC block is provided in the RLC layer for each packet flow coming from the LLC layer. The first RLC block 209 is intended for allocating resources for first class packet flows, and for transmitting the packet flows, the second RLC block 210 is intended for allocating resources for second class packet flows and for transmitting the packet flows, and the third RLC block 211 is intended for allocating resources for both third and fourth class packet flows and for transmitting the packet flows.

In FIG. 2, a data transmission connection is established between the first LLE block 205 and the first RLC block 209 via a first RR interface 213. Correspondingly, a data transmission connection is established between the second LLE block 206 and the second RLC block 210 via a second RR interface 214. Furthermore, a data transmission connection is established between a multiplexing block 212 and the third RLC block 211 via a third RR interface 215. Instead of separate RR interfaces 213, 214, 215, it is also possible to implement communication between the LLC layer and the RLC layer for example via one RR interface block, wherein a multiplexing block (not shown) has to be implemented in the LLC layer, in which block the packet flows coming from packet flows advantageously contain an identifier, by means of which packets belonging to different flows are distinguished from each other and directed to the correct RLC block.

The MAC layer (Media Access Control) is described in more detail in the GSM standard specification 03.64. Correspondingly, the SNDCP level is described in more detail in the GSM standard specifications 04.65 and 03.60, the LLC level in the GSM standard specifications 04.64 and 03.60, and the RLC level in the GSM standard specification 03.64. The MAC is used to allocate radio channels between wireless communication devices, and to allocate a physical radio channel to the wireless communication device for transmission and reception according to the need. The MAC functionality can contain a separate header, which includes a status flag for an uplink, a block type indicator and possible power control information. The MAC header and the RLC data block are located on the physical layer in a radio block to be transmitted via the radio channel.

From the RLC layer, packets are transmitted to the radio channel according to the resources allocated in the mobile communication network. In this preferred embodiment, resource allocation is arranged in such a way that the first RLC block requests the mobile communication network to allocate a fixed resource for first class packets, the second RLC block requests the mobile communication network also to allocate a fixed resource for second class packets, and the third RLC block requests the mobile communication network to allocate a dynamic resource for third and fourth class packets. To achieve fixed resource allocation for first class packets transmitted from the wireless communication device, the wireless communication device performs allocation request signalling with the mobile communication network. In this signalling, the first RLC block of the protocol stack implemented in the application software of the wireless communication device first transmits a channel request message (PACKET_CHANNEL_REQUEST) to allocate a radio channel required in the communication for packet transmission, which is known as such. In the GPRS system used as an example, the form of the channel request message is (as a binary number) 110000pprrr, in which pp indicates the desired priority. After obtaining a channel in the mobile communication network (PACKET_UPLINK_ASSIGNMENT acknowledgement message), the wireless communication device transmits a resource allocation request message (PACKET_RESOURCE_REQUEST). In this message, the wireless communication device communicates, for instance, how wide a bandwidth is required and whether a fixed resource or a dynamic resource is required (Fixed/Dynamic MAC Mode). In the GPRS system, the message has advantageously the format:

<TYPE (6 bits)>
<Global TFI>
<MAC mode (2 bits)>
<TLLI>
<Mobile Radio Capabilities>
<Channel request description>
<Channel coding requested>
{LIH<MA_CHANGE_MARK>}
{LIH<ALLOCATION_REFERENCE>}
<C value>
<RXQUAL>
<SIGN VAR>

Significant with respect to the invention are the MAC mode field and the Channel request description. In this context, it will not be necessary to discuss the other fields in more detail. In the MAC mode field, the wireless communication device indicates whether a fixed resource or a dynamic resource is required. For example with a MAC mode field value 00, a dynamic resource is requested, and with a MAC mode field value 10, a fixed resource is requested. In the Channel request description field, the wireless communication device indicates the bandwidth required for the connection to be established to the network, the priority, RLC mode, LLC frame type and the number of octets transferred via RLC. The following provides an example of this Channel request description message:

<Bandwidth requested (16 bits)>
<LLC-SAPI (4)>
<Priority (2)>
<RLC mode (1)>
<LLC frame type (1)>
<Number of RLC octets (8)>

The bandwidth is, for example a number of 16 bits, with which the bandwidth is indicated with an accuracy of 100 bits/s. The value of the LCC-SAPI field indicates the identifier of that service access point 201, 202, 203, 204 in the LLC layer, via which a packet connection is established and packets of that connection are transmitted in the LLC layer. In this preferred embodiment of the invention, this also identifies the quality of service class, for example in such a way that the value 0011=the first class (the first service access point 201), 0101=the second class (the second service access point 202), 1001=the third class (the third service access point 203) and 1011=the fourth class (the fourth service access point 204).

On the basis of this information contained in the LLC-SAPI field, it is possible in the mobile communication network to define to which quality of service class a connection is desired to be established. This LLC-SAPI information is returned to the wireless communication device which transmitted the request message, on the basis of which, for instance, in the wireless communication device the received acknowledgement message can be directed to the correct connection to be activated. Information on the transmission times allocated for a fixed resource in the packet connection, is also advantageously transmitted in the acknowledgement message to the wireless communication device, wherein the mobile communication network advantageously attends to that two or more packet connections are not transmitting to the same physical channel simultaneously. Correspondingly, in dynamic resourcing, the multiplexing block 212 is advantageously responsible for the timing and time-sharing of the transmissions of packets in different packet connections.

In the above-presented example, a two-stage resource allocation was used. However, if a single stage resource allocation is used, for example by transmitting only a channel request message, a data field corresponding to the LLC-SAPI field has to be attached to this message structure, in which data field a communication class desired for the packet connection can be given to the mobile communication network.

It is obvious that these messages and details of the fields are only examples explicating, but not restricting the invention. For example, the LLC-SAPI information can be replaced with other such information with which the desired communication class/quality of service can be given.

If the mobile communication network is capable of allocating the desired resource at that moment in such a way that it is possible to maintain the quality of service, the mobile communication network returns an acknowledgement message containing information on resource allocation, as well as on the allocated bandwidth, bit rate etc. The acknowledgement message also notifies if it is not possible to allocate a resource at that moment. In that case it is possible to transmit information on such an error situation to an upper layer in the protocol stack, in which it is determined whether transmission can be performed in lower level classes or the connection is left unestablished. After allocating the required resource from the mobile communication network, the wireless communication device can start transmitting first class packets in a way known as such. Resource allocation for different services is affected by the number of active connections at a time and by the quality of service allocated for them.

Following the principles presented above, the second RLC block of the wireless communication device can allocate resources for the transmission of second class packets. For the third and fourth class, it is possible to allocate resources either in two stages, wherein a dynamic resource is requested in the resource allocation request message, or in a single stage, wherein merely a channel request message is used, and the mobile communication network aims at allocating a dynamic resource.

In the above-presented preferred embodiment of the invention, each such quality of service class, for which the aim is to allocate a fixed resource, is provided with an individual RLC block 209, 210. This is necessary in this example system especially for the reason that in the transmission of first class packets, re-transmission of packets is not used, but second class packets can be restrictedly re-transmitted. Re-transmission could risk the quality of service in the first class. However, those quality of service classes for which resources are allocated dynamically, are advantageously provided with one RLC block 211, wherein this RLC block 211 attends to the time-sharing of packets transmitted via the same. This arrangement makes it possible that for each application requiring high quality of service, a certain quality of service can be ensured during the entire connection, if it is possible at the moment of setting up the connection. For example, in a system which contains two quality of service levels defined: one for real time data transmission, and the other for non-real time data transmission, this can be implemented according to the invention in such a way that one RLC block is provided for each quality of service class, wherein also a multiplexing block is not necessary.

If there are packets of a non-real time application to be transmitted but no resources available at the moment, packets of a lower quality of service class wait for their transmission turn in a transmission queue. If a maximum transmission delay is defined for the packets in the transmission queue, an attempt is no longer made to transmit the packet if the transmission delay is exceeded before it is possible to transmit the packet. Thus, the packet is removed from the transmission queue, and the packet possibly following in the same queue is set to wait for transmission, as is known as such.

In the above-presented preferred embodiment of the invention, resource allocation was divided into fixed and dynamic allocation on the basis of whether it was a real time packet connection or a non-real time packet connection in question. The reason for this division is that with fixed resource allocation, it is possible to secure a fast packet transmission more reliably when compared with dynamic resource allocation.

Furthermore, the function of the invention will be described with reference to the appended FIG. 3. FIG. 3 shows the connections of a telecommunication network in a packet-switched GPRS service. The main element of the network infrastructure for GPRS services is a GPRS support node, GSN. It is a mobility router implementing coupling and co-operation between different data networks, for example to a public switched packet data network PSPDN via a connection Gi, or to a GPRS network of another operator via a connection Gp, mobility management together with GPRS registers via a connection Gr, and transmission of data packets to wireless communication devices MS, irrespective of their location. Physically, it is possible to integrate the GPRS support node GSN with a mobile switching center MSC, or it can constitute a separate network element based on the architecture of data network routers. User data is transferred directly between the support node GSN and a base station system BSS composed of base stations BTS and base station controllers BSC, via a connection Gb, but between the support node GSN and the mobile services switching center MSC there is a signalling connection Gs. In FIG. 3, solid lines between the blocks represent data communication (i.e. transmission of speech or data in digital format), whereas broken lines represent signalling. Physically, data can be transferred transparently via the mobile services switching center MSC. The radio interface between the wireless communication device MS and a fixed network runs via the base station BTS and is indicated with the reference Um. References Abis and A denote an interface between the base station BTS and the base station controller BSC, and correspondingly between the base station controller BSC and the mobile services switching center MSC, which is a signalling connection. The reference Gn represents the connection between different support nodes of the same operator. As presented in FIG. 3, the support nodes are typically divided into gateway support nodes GGSN (Gateway GSN) and serving, i.e. home support nodes SGSN (Serving GSN). The GSM system is a time division multiple access system (TDMA), in which communication on the radio channel is time-divided and occurs in consecutively repeated TDMA frames, each composed of several (eight) time slots. In each time slot, an information packet is transmitted in a radio frequency burst with a finite duration and composed of a group of modulated bits. The time slots are used primarily as control channels and communication channels. The communication channels are used for transmitting speech and data, and the control channels are used for signalling between the base station BTS and wireless communication devices MS.

Let us assume that at first, when starting a packet connection set-up to the IP network for an audio application, the user of a wireless communication device MS does not have any active connections to any part of the mobile communication system. It is required that this packet connection is a real time connection at a bit rate of e.g. 30 kbit/s. Thus, it is advantageously the first quality of service class in question. After this, the user activates a packet connection for a video viewing application requiring a slower transfer rate, for example at the bit rate of 10 kbit/s. Consequently, it can be assumed that the second quality of service class is sufficient. Furthermore, the user activates a third packet connection for example for an Internet browser application, in which the bit rate should be in the order of 1 kbit/s in non-real time data transmission. A fourth packet connection that the user yet wishes to activate, is for the transmission of e-mail messages, and the bit rate should be in the order of 100 bit/s in non-real time data transmission.

For the third connection, the third quality of service class is sufficient, and for the fourth connection presented in this example, the fourth quality of service class is sufficient.

In order to activate the first said packet connection, the wireless communication device MS checks, for instance, the types of connections to the mobile communication network activated by the user. It was assumed above that there are no active connections. To allocate radio resources, the wireless communication device first transmits a channel request message to the base station system. This channel request message is described above in this specification; thus, in this context reference is made thereto. The message is advantageously processed in the base station system, which transmits an acknowledgement message to the wireless communication device. In the next phase, the wireless communication device transmits a resource allocation request message, in which the resources required for the connection are reported; in other words, a fixed resource with a bit rate of 30 kbit/s and highest priority, no acknowledgement, and a service access point identifier, which in this example is SAPI=3. In this case, the resource allocation request is processed in the first RLC block 209. If it is possible to allocate such a resource for the packet connection, the base station system transmits, in the acknowledgement message to the wireless communication device, information on the channel and bandwidth allocated for the packet connection, and the service access point identifier transmitted in the corresponding request message.

Correspondingly, to activate the second packet data connection, the wireless communication device first transmits a channel request message and, after receiving an acknowledgement, a resource allocation request message where the parameters are for example fixed resource allocation, the bit rate of 10 kbit/s, the second priority level, acknowledgement available if required by the application, and a service access point identifier (SAPI=5). In this case, the resource allocation request is processed in the second RLC block 210. Also for this packet connection, resources are allocated only if it is possible without risking the quality of service of already activated connections belonging to a higher or equally high quality of service class.

When activating the third packet connection, it is possible to use either the above-presented two-stage resource allocation, wherein in the resource allocation request message, information is transmitted in parameters such as the need for dynamic resource allocation, desired bit rate 1 kbit/s, third priority level, acknowledgement used in transmission of packet connection packets, as well as a service access point identifier (SAPI=9). Another alternative is single-stage activation, wherein merely a channel request message is transmitted from the wireless communication device MS, wherein the carrier service block in the base station system determines, on the basis of the service access point identifier transmitted in this message, the type of the resource requested for the packet connection. Correspondingly, resources for the fourth packet connection are activated with either two-stage or single-stage signalling. In these third and fourth packet connection set-ups, the resource allocation request is processed in the third RLC block 211.

In the hardware used in current mobile communication systems, it is possible to implement the RLC and LLE blocks according to the invention and their functionality with modifications in the software, primarily in sections of the implementation of protocol stacks.

The present invention is not restricted solely to the above-presented embodiments, but it can be modified within the scope of the appended claims. The invention can also be applied for example in the UMTS system (Universal Mobile Telecommunication System).

What is claimed is:

1. A method for allocating resources for a data transmission connection between a wireless communication device and a mobile communication network comprising:

dividing information to be transmitted on the basis of a quality of service class to be used for transmission;

allocating a fixed resource for the data transmission connection for information having a quality of service class for which a fixed resource is to be utilized; and allocating a dynamic resource for the data transmission connection for information having a quality of service class for which a dynamic resource is to be utilized.

2. The method according to claim 1, further comprising:

processing information having the quality of service class for which a fixed resource is utilized in one RLC block of an RLC/MAC layer; and processing information having all other quality of service classes in a common RLC block of an RLC/MAC layer.

3. The method according to claim 2, wherein the information is transmitted in packets, the method further comprising dividing data packets coming from upper layers of a protocol stack to an LLC layer into different LLE blocks on the basis of quality of service requirements defined for each packet.

4. The method according to claim 1, further comprising utilizing the wireless communication device to identify the quality of service class in the mobile communication network.

5. The method according to claim 4, further comprising:

attaching an LLC service access point identifier to each quality of service class, and;

identifying the quality of service class in the mobile network by transmitting the LLC service access point identifier assigned to the quality of service class.

6. The method according to claim 1, further comprising allocating a fixed resource for the data transmission connections in which data transmission is performed substantially in real time.

7. A communication device for processing and transmitting information to be transmitted in packet form in one or more data transmission connections, the communication device comprising:

circuitry for dividing the information on the basis of a quality of service class to be used for transmission; and means for allocating resources for each said data transmission connection on the basis of the quality of service class in which the information to be transmitted in the data transmission connection is divided, wherein the means for allocating resources comprise means for fixed resource allocation and means for dynamic resource allocation.

8. The communication device according to claim 7, characterized in that it comprises means for processing information according to a protocol stack, which contains at least an LLC layer and an RLC/MAC layer, and that the means (209, 210) for fixed resource allocation and the means (211) for dynamic resource allocation are established in the RLC/MAC layer.

9. The communication device according to claim 8, characterized in that it comprises means for identifying a quality of service class in the mobile communication network.

10. A communication system, in which information is arranged to be transmitted in packet form in one or more data transmission connections between a wireless communication device (MS) and a mobile communication network, the communication system comprising:

circuitry for dividing the information on the basis of a quality of service class to be used for transmission;

means for allocating resources for each said data transmission connection on the basis of the quality of service class in which the information to be transmitted in the data transmission connection is divided, wherein the means for allocating resources comprise means for fixed resource allocation and means for dynamic resource allocation.

11. A method for allocating resources for a data transmission connection between a wireless communication device and a mobile communication network comprising:

dividing information to be transmitted on the basis of a quality of service class to be used for transmission;

allocating a fixed resource for the data transmission connection for information having a first quality of service class; and allocating a dynamic resource for the data transmission connection for information having another quality of service class.

12. The method according to claim 1, further comprising:

processing information having the first quality of service class in one RLC block of an RLC/MAC layer; and processing information having all other quality of service classes in a common RLC block of an RLC/MAC layer.

13. The method according to claim 12, wherein the one RLC block requests allocation of the fixed resource from the mobile communication network.

14. The method according to claim 12, wherein the common RLC block requests allocation of the dynamic resource from the mobile communication network.

* * * * *